United States Patent [19]

Salingre et al.

[11] Patent Number: 5,729,528
[45] Date of Patent: Mar. 17, 1998

[54] DATA TRANSMISSION SYSTEM HAVING A MONITORING FUNCTION FOR MONITORING THE CONGESTION OF LINKS AND NODE INTENDED TO BE USED IN SUCH A SYSTEM

[76] Inventors: Daniel Salingre, 77, rue Toulouse-Lautrec, 91300 Massy, France; Armel Davoult, 14, rue Paul Fort, 78140 Velizy, France

[21] Appl. No.: 523,832

[22] Filed: Sep. 6, 1995

[30] Foreign Application Priority Data

Sep. 7, 1994 [FR] France ............... 94 10724

[51] Int. Cl.$^6$ .................. H04J 3/14; H04L 12/56
[52] U.S. Cl. ............... 370/230; 370/232; 370/218
[58] Field of Search .................. 370/218, 219, 370/230, 231, 232, 233, 234, 237, 254, 225; 379/221; 395/200.06, 200.13

[56] References Cited

FOREIGN PATENT DOCUMENTS

WO9012466  10/1990  WIPO .............. H04L 12/64

OTHER PUBLICATIONS

Computer Networks and ISDN Systems, vol. 25, No. 3, Sep. 1992, Amsterdam NL pp. 241-257, R. Krishna Thilakam et al "The Design and Flow Control of A High Speed, Integrated, Packet Switched Network".

CCITT REcommendations X.1-X.32 1989.

*Primary Examiner*—Douglas W. Olms
*Assistant Examiner*—Min Jung

[57] ABSTRACT

According to the invention, a data transmission system is provided in which data streams corresponding to file transfer applications are separated from those that correspond to transaction traffic. Each node of the system has a monitoring function for monitoring a congestion of interconnection links to measure a load caused by local file transfer applications. A switch switches at least one communication onto the switched network when said load exceeds a predetermined level.

6 Claims, 3 Drawing Sheets

DATA TRANSMISSION SYSTEM HAVING A MONITORING FUNCTION FOR MONITORING THE CONGESTION OF LINKS AND NODE INTENDED TO BE USED IN SUCH A SYSTEM

BACKGROUND OF THE INVENTION

1. Field of the Invention

The present invention relates to a data transmission system comprising a plurality of nodes interconnected by links for establishing communications that relate at least to file transfer applications and to transaction applications, while certain of these nodes have at least one access to a switched network.

The invention has applications with particular advantage especially in the field of interconnecting local area networks by wide-area networks of the X25 type, for example.

2. Discussion of the Related Art

The use of wide area networks for interconnecting local area networks alters the nature of data streams transported by a network. File transfer traffic is added to conventional transaction traffic. The problem then posed is that of the handling of these two types of traffic without an oversizing the capacity of the links.

Therefore, specifically from the multilink protocol defined in Recommendation X25 of the CCITT it is known to use one or various links of a switched network customarily used as backup links in order to spread the whole of the traffic of a link that is temporarily congested. This method, however, has various disadvantages. On the one hand, it is a local handling of the congestion which is thus to be repeated on each section of the link between the source node and the destination node. On the other hand, this handling has an effect on the whole traffic and thus particularly on the transaction traffic. The fact of rerouting the transaction traffic leads to an interruption of the communication for a brief period of time and thus leads to an annoyance on the side of the user.

SUMMARY OF THE INVENTION

It is an object of the invention to propose a data transmission system that overcomes the above-mentioned disadvantages.

Therefore, a data transmission system according to the invention and as defined in the opening paragraph is characterized in that each of these nodes comprises:

- stream splitting means for establishing separate communications for file transfer applications and for transaction applications,
- means for forming a group of at least one communication that corresponds to a local file transfer application,
- measuring means for measuring the load caused by said group,
- means for switching at least partly said group onto the switched network when said load is higher than a level called high level, and as long as it remains higher than a level called low level.

In a particularly advantageous embodiment of a data transmission system according to the invention, for switching at least partly said group onto the switched network, each of said nodes comprises:

- means for establishing an end-to-end connection between the source node and destination node,
- closing the corresponding communications,
- re-establishing said communications in the switched network.

The invention likewise relates to a node and particularly to an X25 switch intended to be used in such a system.

BRIEF DESCRIPTION OF THE DRAWINGS

These and other aspects of the invention will be apparent from and elucidated with reference to the embodiments described hereinafter.

In the drawings.

DETAILED DESCRIPTION OF THE PREFERRED EMBODIMENTS

Figure 1:
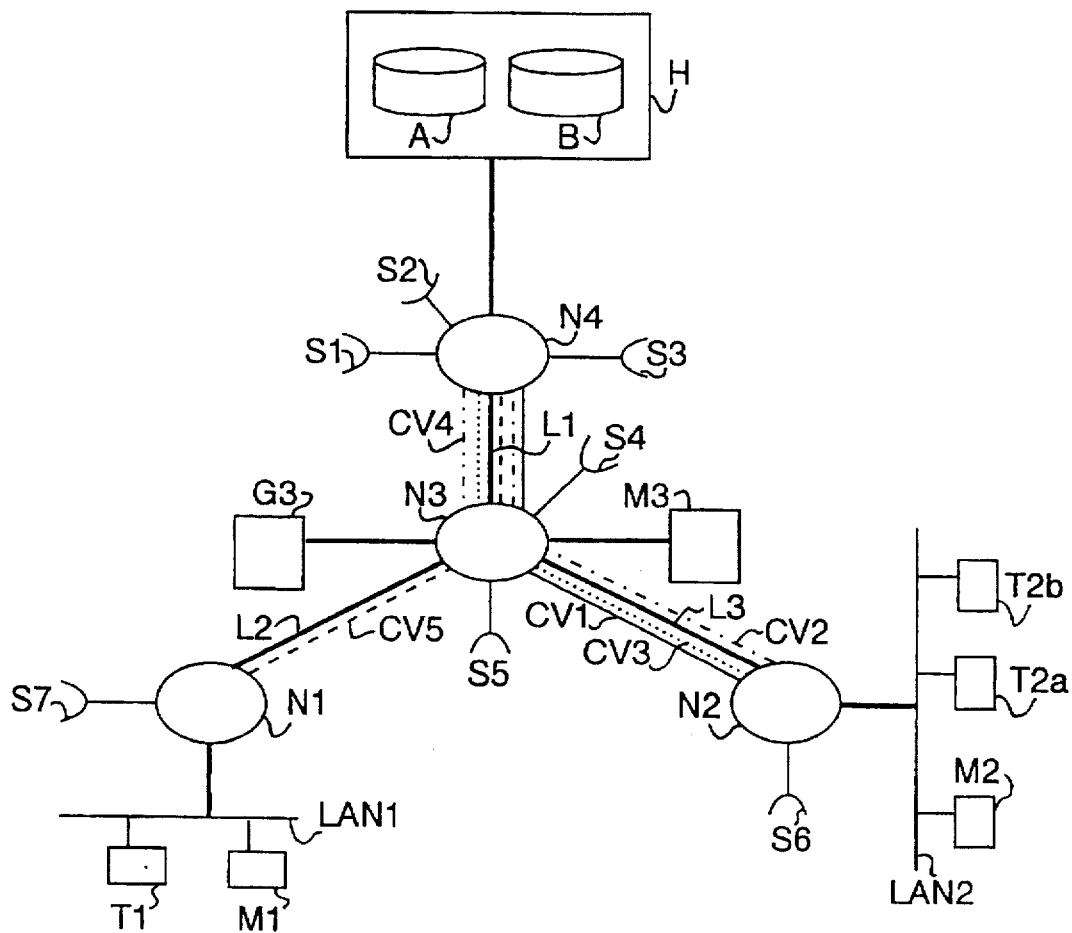
FIG. 1 represents in a diagram an embodiment for a transmission system according to the invention.

According to FIG. 1 a data transmission system according to the invention comprises a plurality of nodes N1, N2, N3 and N4, the nodes N1 and N3, N2 and N3 and N3 and N4 being interconnected by the respective leased lines L2, L3 and L1. The system thus represented by way of example in this FIG. 1 forms a bank network. The node N4 connects to the network H a server via which various databases A and B are available for handling file transfer applications or transaction applications. This node N4 further has three accesses S1, S2 and S3 to a switched network provided as a backup network in case a node or a link has a breakdown. The node N3 has two accesses S4 and S5 to said switched network and is directly connected to a cash dispenser machine M3 and to a teller's counter G3. Finally, the nodes N2 and N1 have an access S6 and S7 respectively, to said switched network. They interconnect a local area network LAN1, LAN2 respectively, to which are connected money dispenser machines M1, M2 respectively, with management terminals of customers' accounts T1, T2a and T2b, respectively.

In this embodiment, the network formed by the four nodes N1, N2, N3 and N4 is a network of the X25 type and the switched backup network is a network of the RNIS type. However, the invention may be applied to other types of networks (frame relay, switched telephone network . . . ).

According to the invention, the data streams corresponding to file transfer applications and the data streams corresponding to transaction applications are to be separate, so that each node can measure the load that corresponds to the file transfer applications for the communications for which it plays the role of source node. Therefore, different addresses are assigned to the various applications, which applications may or may not occur in the same machine. When the applications occur in different machines, their network addresses are different. Conversely, the same network address for various applications is to be distinguished as to their application.

In an X25 network, the calling and called addresses are formed by more than 15 decimal digits. The networks do not generally use all these positions for coding the calling and called addresses. In an advantageous embodiment the invention uses the remaining positions for encoding the addresses as to their application.

By way of example, the French Transpac network only uses 9 positions for coding its addresses. In the case where the node N4 is accessed via the Transpac network, "123456789" being the address of the node N4 in the Transpac network, and "10" being the number of the output link of the node N4 to the server H, the address of the file transfer applications (database A) is written as, for example, 123456789-10-08, where "08" corresponds to the number of the database A. And the address of the transaction applications (database B) is written as 123456789-10-09, where "09" corresponds to the number of the database B.

Similarly, in the case where the set of nodes of the system belongs to a private network having, for example, number "2080", if the number of the node N4 in this network is "30", the address of the file transfer applications is written as 2080-30-10-08, and the address of the transaction applications is written as 2080-30-10-09.

Thus, with respect to FIG. 1, three different virtual circuits CV1, CV2 and CV3 are open following a call from the distributor M2 to the database B to verify whether the card it is processing forms part of the file of stolen cards, and following a call from the terminals T2a and T2b to the database A to search among the customer's files. These three virtual circuits physically travel on the same links, the links L1 and L3.

Moreover, still according to FIG. 1, a virtual circuit CV4 is also established between the nodes N3 and N4 following a request to transfer a file from teller's counter G3 to the database A. And a virtual circuit CV5 is established between the nodes N1 and N4 following a request to transfer a file from the terminal Ti to the database A.

In the embodiment to be described in the following, each node has measuring means for measuring the total load of the file transfer applications for which it plays the role of source node. To this end, the virtual circuits of the same nature (that is to say, which correspond either to the local area network file transfer traffic or to the wide-area network file transfer traffic, or to the transactional traffic), and having the same node as their destination, are regrouped on the same virtual line in conformity with the scheme represented in FIG. 3, and the traffic is measured by this virtual line.

In another embodiment, however, it is possible to measure the individual load of the virtual circuits for which the node plays the role of source node.

Figure 3:
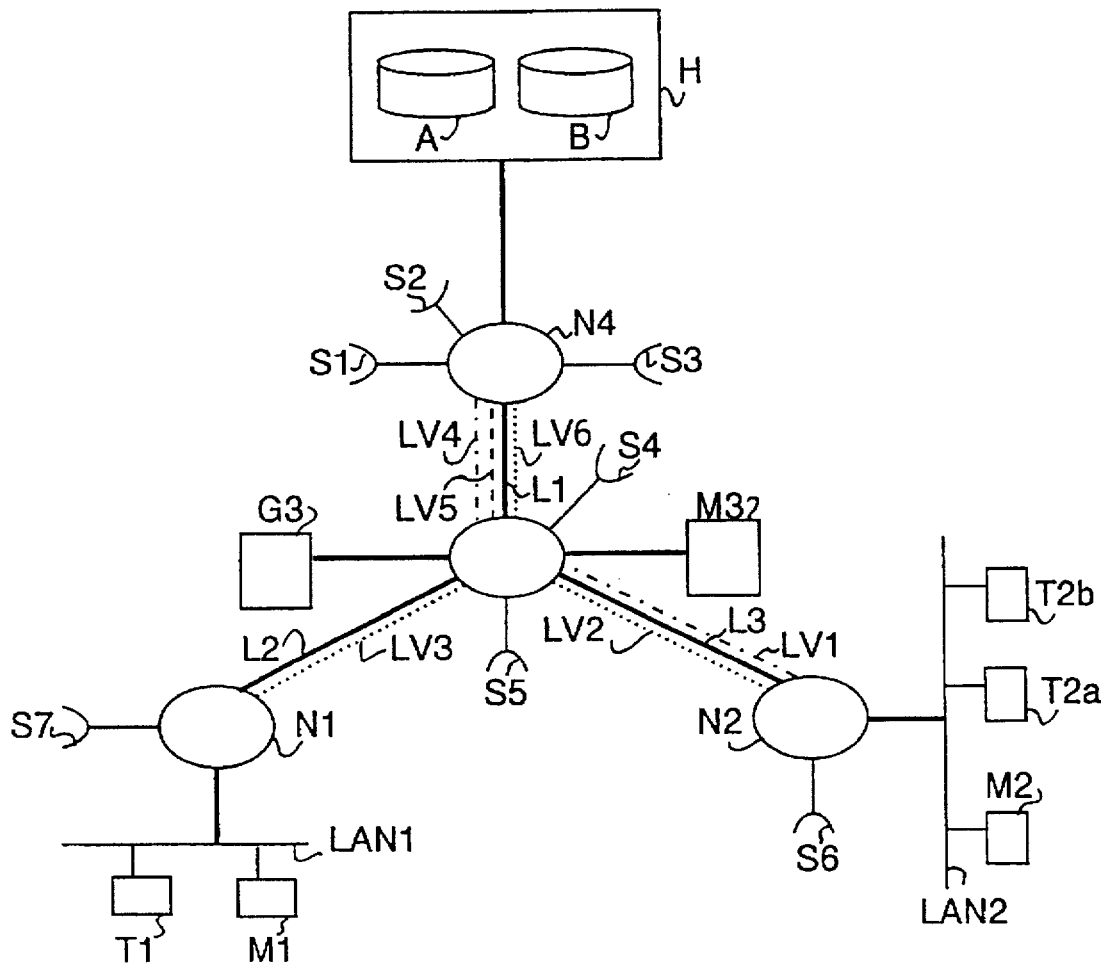
FIG. 3 represents in another form the transmission system shown in FIG. 1, and, FIG. 4 represents an example of a node according to the invention.

According to FIG. 3 the link L3 which interconnects the nodes N2 and N3 is formed by two virtual lines LV1 and LV2 respectively, dedicated to the transaction traffic that corresponds to the virtual circuit CV1 and to the local area network file transfer traffic that corresponds to the virtual circuits CV2 and CV3. The link L2 is formed by a single virtual line LV3 dedicated to the local area network file transfer traffic that corresponds to the virtual circuit CV5. And the link L1 is formed by three virtual lines LV4, LV5 and LV6 respectively, dedicated to the transaction traffic that corresponds to the virtual circuit CV1, to the wide-area network file transfer traffic that corresponds to the virtual circuits CV2, CV3 and CV5, and to the local area network file transfer traffic that corresponds to the virtual circuit CV4.

The nodes N1, N2 and N3 thus monitor each the load caused by the local area network file transfer traffic, that is to say, the load on the virtual line LV3 for the node N1, on the virtual line LV2 for the node N2 and on the virtual line LV6 for the node N3.

Figure 2:
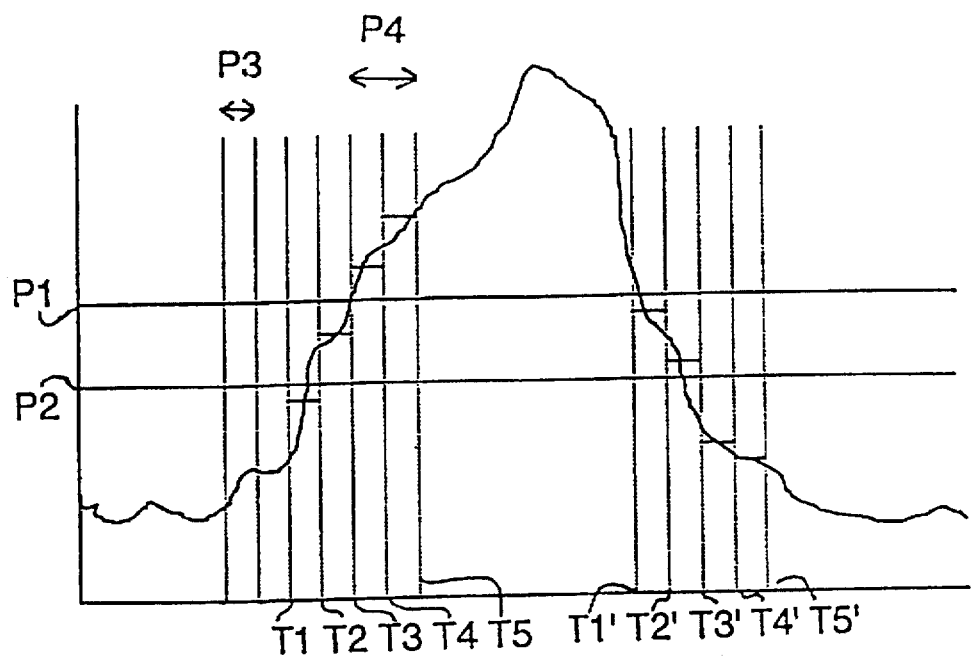
FIG. 2 is a graph explaining the principle used for measuring the load.

FIG. 2 shows a graph which explains the calculation mode of such a load. To this end, a set of parameters is defined for each link:

- a first parameter P1, called upper threshold, corresponding to a first percentage of the nominal rate of the link (80%, for example), and beyond which a congestion is detected,
- a second parameter P2, called lower threshold, corresponding to a second percentage of the nominal rate of the link (40%, for example), and from which onwards a decongestion is detected,
- a third parameter P3 defined for all the virtual lines of a node, and called integration time, which indicates the period of time in which the calculation is effected, and which is, for example, equal to 20 seconds,
- a fourth parameter P4 called consolidation parameter which indicates how many times in succession a surpassing of the upper or lower threshold is to be detected before being confirmed, and which is, for example, equal to 2.

In FIG. 2 time is represented along the X-axis and the line load as a percentage of the nominal rate of the link is shown along the Y-axis. Between the instants T1 and T2 which are 20s apart, the load is lower than the lower threshold P2. Between the instants T2 and T3 the load lies between the lower and upper thresholds P2 and P1, respectively. Between the instants T3 and T4, then between the instants T4 and T5 the load is higher than the upper threshold P1. The congestion of the line is thus detected two times in a row and is thus confirmed at instant T5.

Similarly, between the instants T1' and T2', then between the instants T2' and T3', the load lies between the upper and lower thresholds P1 and P2, respectively. And between the instants T3' and T4', then T4' and T5', the load is less than the lower threshold P2. The decongestion thus being detected two times in a row, it is confirmed at the instant T5'.

When an exceeding of the upper threshold is confirmed, the node seeks to establish a switched link with the addressee of the communication so as to switch all the communications onto this switched link and close the corresponding virtual circuits. Such a switched link between the source node and the node of the addressee of the packets is denoted as an end-to-end link. In certain cases; when the two ends of the links (that is to say, the server and the remote user) are incapable of re-establishing themselves the virtual circuits in the switched link, it is the end-nodes which are loaded.

In another embodiment it is equally possible to switch only certain communications of the virtual line onto the switched network.

In order to effect this switching, each node has a predefined routing Table which combines the addresses of the file transfer applications in the network, the numbers of virtual output lines of the node which are dedicated to the corresponding local area network file transfer traffic, the switched standby access numbers usable from the node, and the addresses on the switched network of the node of the addressee. By way of example, and with reference to FIG. 1, the predefined routing Table of the node N2 contains:

- the address on the network of the file transfer applicant, that is to say, of the database A,
- the number of the virtual line LV2,
- the number S6 of the access to the switched network of node N2,
- and the addresses of the node of the addressee N4 on the switched network, that is to say, the addresses of the accesses S1, S2 and S3 to the switched network.

Thus, when a congestion is confirmed on the virtual line LV2, the node establishes a faster switched link (64 kbit/s for a B channel (ISDN) as against 9600 b/s for a leased line) to the addressee's node N4 via one of the accesses S1, S2 or, S3, then closes the virtual circuit CV2, so that the whole capacity of the leased line L3 remains available for the transaction application that corresponds to the virtual line LV1.

On the other hand, as soon as a congestion is confirmed on this switched link, the node N2 re-establishes the virtual circuit CV2 towards the node N4 and closes the switched link.

Figure 4:
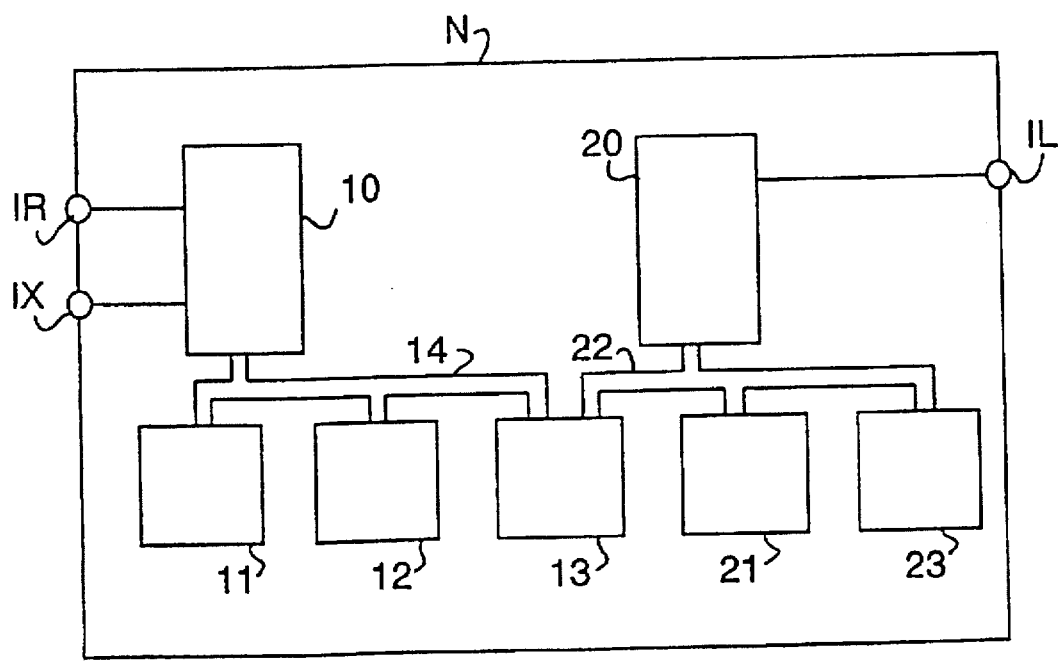

FIG. 4 shows an X25 switch according to the invention, denoted N. Such a switch comprises at least an X25 network interface denoted IX and a RNIS interface denoted IR which are connected to an application processor 10 formed, for example, by a Motorola 68360. This processor 10 itself is connected by a bus 14 to a node configuration memory 11. The processor 10 is also connected by this bus 14 to a read-only memory 12 which contains the operating instructions of the processor 10, more specifically, those necessary for implementing the invention, and to a random-access memory 13 which contains data and, in particular, for each link of the node, the various parameters necessary for calculating the load on this link, as well as said predefined routing Table. The node N also has a local area network interface IL. By way of example, for an Ethernet local area network this interface is connected to a communication controller 20 formed, for example, by an Intel 82503 transmitter and an Intel 82596DX controller. This communication controller 20 itself is connected by a bus 22 to a communication processor 23 formed, for example, by an INMOS T400, to a read-only memory 21 which contains the operating instructions of the communication processor 23, and to said data memory 13.

It will be evident that modifications may be made to the embodiment that has just been described, more specifically, by substituting equivalent technical means without departing thereby from the scope of the present invention.

Particularly the splitting of the data streams and the measuring of the load on a link may be realised according to other methods and those described here by way of example.

We claim:

1. A data transmission system comprising a plurality of nodes interconnected by links for establishing communications that relate at least to file transfer applications and transaction applications, certain ones of said plurality of nodes having at least one access to a switched network, wherein each of the certain ones of said plurality of nodes comprises:

stream splitting means for establishing separate communications for file transfer applications and for transaction applications, means for forming a group of at least one communication that corresponds to a local file transfer application, measuring means for measuring a load caused by a formation of a group by said group forming means, and means for switching, at least partly, said group onto the switched network when said load is higher than a first level called high level, and as long as said load remains higher than a second level called low level.

2. The data transmission system as claimed in claim 1, wherein said means for switching at least partly said group onto the switched network comprises:

means for establishing an end-to-end connection between a source node and a destination node, means for closing corresponding communications, and means for re-establishing communications in the switched network.

3. The data transmission system as claimed in claim 1, wherein said stream splitting means utilizes data destination address as a splitting criterion.

4. The data transmission system as claimed in claim 1, wherein said means for measuring the load comprises:

means for measuring the load during a predefined time interval, and means for detecting an exceeding of the high level or the low level upon a confirmation of such an exceeding of the high level or the low level a given number of times.

5. A network node for use in a data transmission system, the data transmission system comprising a plurality of nodes interconnected by links for establishing communications that relate at least to file transfer applications and to transaction applications, and having at least an access to a switched network, said network node comprises:

stream splitting means for establishing separate communications for file transfer applications and for transaction applications, means for forming a group of at least one communication that corresponds to a local file transfer application, measuring means for measuring a load caused by a formation of a group by said group forming means, and means for switching, at least partly, said group onto the switched network when said load is higher than a first level called high level, and as long as said load remains higher than a second level called low level.

6. A switch for use in a packet switching network of the X25 type, comprising:

means for interfacing with a packet switching network link, means for interfacing with a switched network usable as a backup network connection, stream splitting means for establishing separate communications for file transfer applications and for transaction applications, means for forming a group of at least one communication that corresponds to a local file transfer application, measuring means for measuring a load caused by formation of a group by said group forming means, and means for switching, at least partly, said group from the packet switching network onto the switched network when said load is higher than a first level called high level, and as long as said load remains higher than a second level called low level.

* * * * *